US006132643A

United States Patent [19]
Pavel

[11] Patent Number: 6,132,643
[45] Date of Patent: Oct. 17, 2000

[54] FLUORESCENT PHOTOSENSITIVE VITROCERAMICS AND PROCESS FOR THE PRODUCTION THEREOF

[76] Inventor: Eugen Pavel, Calea Mosilor nr. 274, Apt. 34, 73252, Bucharest, Romania

[21] Appl. No.: 09/123,133

[22] Filed: Jul. 27, 1998

[51] Int. Cl.[7] ................. C03C 4/04; C03C 4/12
[52] U.S. Cl. ............ 252/301.4 R; 252/301.4 H; 501/64; 501/13; 501/57; 501/73; 501/74
[58] Field of Search .......... 252/301.4 R, 301.4 F, 252/301.4 H; 501/64, 13, 57, 74, 73

[56] References Cited

U.S. PATENT DOCUMENTS

| | | | |
|---|---|---|---|
| 2,326,012 | 8/1943 | Dalton | 95/5 |
| 2,422,472 | 6/1947 | Dalton | 49/92 |
| 2,515,937 | 7/1950 | Stookey | 49/92 |
| 2,651,145 | 8/1953 | Stookey | 49/88 |
| 3,549,554 | 12/1970 | Hirayama et al. | 252/301.6 |
| 3,846,142 | 11/1974 | Buzhinsky et al. | 106/47 R |
| 3,923,529 | 12/1975 | Araujo et al. | 501/13 |
| 4,075,120 | 2/1978 | Myers et al. | 252/301.4 P |
| 4,076,541 | 2/1978 | Rapp | 106/47 Q |
| 4,219,704 | 8/1980 | Russell | 179/100.3 B |
| 4,288,861 | 9/1981 | Swainson et al. | 365/127 |
| 4,458,345 | 7/1984 | Bjorklund et al. | 369/103 |
| 4,839,092 | 6/1989 | Lindmayer | 252/301.4 S |
| 4,927,681 | 5/1990 | Chikuma | 428/64 |
| 5,163,039 | 11/1992 | Lindmayer | 369/100 |
| 5,182,669 | 1/1993 | Chikuma et al. | 359/241 |
| 5,191,574 | 3/1993 | Henshaw et al. | 369/100 |
| 5,212,120 | 5/1993 | Araujo et al. | 501/13 |
| 5,253,198 | 10/1993 | Birge et al. | 365/106 |
| 5,278,816 | 1/1994 | Russell | 369/100 |
| 5,325,324 | 6/1994 | Rentzepis | 365/127 |
| 5,399,451 | 3/1995 | Hashida et al. | 430/19 |
| 5,502,706 | 3/1996 | Yang et al. | 369/100 |
| 5,532,104 | 7/1996 | Goto | 430/139 |
| 5,568,460 | 10/1996 | Saikan et al. | 369/100 |
| 5,754,511 | 5/1998 | Gemma et al. | 369/100 |

FOREIGN PATENT DOCUMENTS

| | | |
|---|---|---|
| 199 409 A1 | 10/1986 | European Pat. Off. . |
| 356 746 A2 | 3/1990 | European Pat. Off. . |
| 396 943 A2 | 11/1990 | European Pat. Off. . |
| 534 045 A1 | 3/1993 | European Pat. Off. . |
| 640 571 A1 | 3/1995 | European Pat. Off. . |
| 709 345 A1 | 5/1996 | European Pat. Off. . |
| WO 91/07651 | 5/1991 | WIPO . |
| WO 93/02454 | 2/1993 | WIPO . |
| WO 95/16994 | 6/1995 | WIPO . |
| WO 96/34394 | 10/1996 | WIPO . |
| WO 97/13251 | 4/1997 | WIPO . |
| WO 98/54607 | 2/1998 | WIPO . |
| WO 98/25262 | 6/1998 | WIPO . |

OTHER PUBLICATIONS

Stookey, S.D., "Photosensitive Glass," *Industrial and Engineering Chemistry*, vol. 41, No. 4, pp. 856–861 (Apr. 1949).
Stookey, S.D., "Catalyzed Crystallization of Glass in Theory and Practice," *Industrial and Engineering Chemistry*, vol. 51, No. 7, pp. 805–808 (Jul. 1959).
Kirk, J.P., "Hologram on Photochromic Glass," *Applied Optics*, vol. 5, No. 10, pp. 1684–1685 (Oct. 1996).
Bosomworth, D.R. et al., "Thick Holograms In Photochromic Materials," *Applied Optics*, vol. 7, No. 1, pp. 95–98 (Jan. 1968).
Auzel, F. et al., "Rare Earth Doped Vitroceramics: New, Efficient, Blue and Green Emitting Materials for Infrared Up–Conversion," *J. Electrochem. Soc.: Solid–State Science And Technology*, vol. 122, No. 1, pp. 101–107 (Jan. 1975).
Stookey, S.D. et al., "Full–color photosensitive glass," *J. Appl. Phys.*, vol. 49, No. 10, pp. 5114–5123 (Oct. 1978).
Parthenopoulos, D.A. et al., "Three–Dimensional Optical Storage Memory," *Science*, vol. 245, No. 4920, pp. 843–845 (Aug. 25, 1989).
Jutamulia, S. et al., "Erasable optical 3D memory using novel electron trapping (ET) materials," *SPIE Optical Data Storage Technologies*, vol. 1401, pp. 113–118 (1990) no month.
Hunter, S. et al., "Potentials of two–photon based 3–D optical memories for high performance computing," *Applied Optics*, vol. 29, No. 14, pp. 2058–2066 (May 10, 1990).
Trotter, D.M., Jr., "Photochromic and Photosensitive Glass," *Scientific American*, pp. 124–129 (Apr. 1991).
Strickler, J.H. et al., "Three–dimensional optical data storage in refractive media by two–photon point excitation," *Optics Letters*, vol. 16, No. 22, pp. 1780–1782 (Nov. 15, 1991).
Doan, V. V. et al., "Luminescent Color Image Generation on Porous Silicon," *Science*, vol. 256, No. 5065, pp. 1791–1792 (Jun. 26, 1992).
Nie, S. et al., "Probing Individual Molecules with Confocal Fluorescence Microscopy," *Science*, vol. 266, No. 5187, pp. 1018–1021 (Nov. 11, 1994).
Psaltis, D. et al., "Holographic Memories," *Scientific American*, vol. 273, No. 5, pp. 70–76 (Nov. 1995).
The Confocal System Leica TCS NT, Leica Microscopy and Scientific Instruments Group, Heerbrugg, Switzerland (1996) no month.
D. von der Linde et al., "Breakdown threshold and plasma formation in femtosecond laser–solid interaction," *J. Opt. Soc. Am. B.*, vol. 13, No. 1, pp. 216–222 (Jan. 1996).

(List continued on next page.)

*Primary Examiner*—C. Melissa Koslow
*Attorney, Agent, or Firm*—Herbert Dubno

[57] ABSTRACT

This invention relates to fluorescent photosensitive vitroceramics and the process for the production thereof. The fluorescent photosensitive vitroceramics according to the present invention employ fluorosilicate glass compositions including various photosensitizing metals and rare earths which impart photosensitive properties and fluorescent properties to the vitroceramic. After irradiation, the photosensitive agents control the precipitation of fine fluoride crystals which also contain rare earth ions. These rare earth ions can be made to fluoresce in a controlled manner. The inventive fluorescent photosensitive vitroceramics can be used in photographic applications, florescent displays and computer memories.

16 Claims, No Drawings-

OTHER PUBLICATIONS

Neifeld, M.A. et al., "Optical memory: introduction by the feature editors," *Applied Optics,* vol. 35, No. 14, p. 2345 (May 10, 1996).

Ueki, H. et al., "Three–dimensional optical bit–memory recording and reading with a photorefractive crystal: analysis and experiment," *Applied Optics,* vol. 35, No. 14, pp. 2457–2465 (May 10, 1996).

König, K. et al., "Cell damage in near–infrared multimode optical traps as a result of multiphoton absorption," *Optics Letters,* vol. 21, No. 14, pp. 1090–1092 (Jul. 15, 1996).

Piyaket, R. et al., "Two–photon–induced photochromic reactions in spirobenzopyran–doped poly(methyl methacrylate) thin–film waveguides," *Optics Letters,* vol. 21, No. 14, pp. 1032–1034 (Jul. 15, 1996).

Dvornikov, A.S. et al., "Molecular transformation as a means for 3D optical memory devices," *Optics Communications,* vol. 128, Nos. 4–6, pp. 205–210 (Jul. 15, 1996).

Bernal, M–P. et al., "Holographic–Data–Storage Materials," *MRS Bulletin,* vol. 21, No. 9, pp. 51–60 (Sep. 1996).

Davis, K.M. et al., "Writing waveguides in glass with a femtosecond laser," *Optics Letters,* vol. 21, No. 21, pp. 1729–1731 (Nov. 1, 1996).

Shen, X.A. et al., "Experimental demonstration of impulse–equivalent time–domain optical memory," *Optics Letters,* vol. 21, No. 24, pp. 2020–2022 (Dec. 15, 1996).

Glezer, E.N. et al., "Three–dimensional optical storage inside transparent materials," *Optic Letters,* vol. 21, No. 24, pp. 2023–2025 (Dec. 15, 1996).

Moscovitch, M. et al., "Simulation of radiation effects on three–dimensional computer optical memories," *J. Appl. Phys.,* vol. 81, No. 1, pp. 58–69 (Jan. 1, 1997).

Maruo, S. et al., "Three–dimensional microfabrication with two–photon–absorbed photopolymerization," *Optics Letters,* vol. 22, No. 2, pp. 132–134 (Jan. 15, 1997).

König, K., "Cellular response to near–infrared femtosecond laser pulses in two–photon microscopes," *Optics Letters,* vol. 22, No. 2, pp. 135–136 (Jan. 15, 1997).

Ha, T. et al., "Single molecule spectroscopy with automated positioning," *Appl. Phys. Lett.,* vol. 70, No. 6, pp. 782–784 (Feb. 10, 1997).

Dianov, E.M. et al., "Refractive–index gratings written by near–ultraviolet radiation," *Optics Letters,* vol. 22, No. 4, pp. 221–223 (Feb. 15, 1997).

Dvornikov, A.S. et al., "Novel organic ROM materials for optical 3D memory devices," *Optics Communications,* vol. 136, Nos. 1, 2, pp. 1–6 (Mar. 1, 1997).

Kikuchi, S. et al., "Three–dimensional image reconstruction for biological micro–specimens using a double–axis fluorescence microscope," *Optics Communications,* vol. 138, Nos. 1–3, pp. 21–26 (May 15, 1997).

Pavel, E. et al., "Fluorescent Photosensitive Glass—A Novel Material for Optical Memory and Fluorescence Holography," *Journal of Solid State Chemistry,* vol. 134, pp. 362–363 (Jul. 29, 1997).

"Packing Density Reaches 1 Tb/in$^2$ in the 2010s," *Optoelectronic Industry and Technology Development Association (OITDA) Newsletter,* No. 4 (Jan. 30, 1998).

Andersen, G. et al., "Holographically corrected microscope with a large working distance," *Applied Optics,* vol. 37, No. 10, pp. 1849–1853 (Apr. 1, 1998).

Hogenboom, D.O. et al., "Three–dimensional images generated by quadrature interferometry," *Optics Letters,* vol. 23, No. 10, pp. 783–785 (May 15, 1998).

Tomov, I.V. et al., "Pulse broadening in femtosecond x–ray diffraction," *Journal of Applied Physics,* vol. 83, No. 10, pp. 5546–5548 (May 15, 1998).

Kawata, Y. et al., "Use of two–photon absorption in a photo–refractive crystal for three–dimensional optical memory," *Optics Letters,* vol. 23, No. 10, pp. 756–758 (May 15, 1998).

Pavel, E. et al., "Three–dimensional memory effect in fluorescent photosensitive glass activated by europium and cerium," *Optics Letters,* vol. 23, No. 16, pp. 1–3, (Aug. 15, 1998).

FLUORESCENT PHOTOSENSITIVE VITROCERAMICS AND PROCESS FOR THE PRODUCTION THEREOF

BACKGROUND OF THE INVENTION

This invention relates to fluorescent photosensitive vitroceramics and processes for making them. More specifically, this invention relates to fluorosilicate vitroceramics exhibiting both fluorescent and photosensitive properties. These fluorescent and photosensitive properties are imparted to the inventive vitroceramics by the inclusion of certain rare earths and certain photosensitizing metals in the vitroceramic composition.

A vitroceramic is a glass matrix having fine crystals precipitated therein. Vitroceramic material is obtained by first melting a glass, such as a fluorosilicate glass, in any conventional manner. The resultant glass is then subjected to a heat treatment at a temperature above the glass transition temperature, thereby preferentially precipitating small crystals. Once the crystals are precipitated, the material has been transformed from glass to a vitroceramic.

Generally, when crystals are precipitated in a glass, the optical transmission is significantly reduced because the crystals cause light scattering. However, if the precipitated crystals are very small (e.g., smaller than the wavelength of incident light), and, if the difference in refractive index between the crystals and the glass matrix is also small, the loss of optical transmission due to light scattering is substantially minimized.

Crystal precipitation can be controlled with nucleation seeds which serve as catalysts for the crystal precipitation process. The efficiency of a given catalyst depends on a number of factors, including the similarity between the catalyst's own crystal structure and that of the crystal phase to be nucleated.

A vitroceramic exhibits different physical and chemical properties than the glass material from which it originates. Vitroceramics also are isotropic, flexible as to shape, and their production cost is relatively low.

Some vitroceramics are fluorescent. Fluorescent materials convert incident light having a wavelength in one area of the spectrum into light having a wavelength in a different area of the spectrum. For example, when exposed to ultraviolet light, some fluorescent materials can convert that ultraviolet light into visible light. Some fluorescent materials can convert infrared light into visible light in a phenomenon known as up-conversion. In 1975, F. Auzel doped vitroceramics with rare earth metals. These vitroceramics converted infrared radiation into visible light (see F. Auzel, et al., *Journal of Electrochemical Society* 122(1)(1975), 101).

Some vitroceramics are photosensitive. When photosensitive vitroceramics are irradiated with short wavelength radiation such as ultraviolet radiation or X-rays, the optical properties of the material in the irradiated areas are modified. Photosensitive vitroceramics generally contain photosensitive metals such as copper (Cu), silver (Ag) and gold (Au). The photosensitive metals, upon exposure to the incident radiation, absorb that radiation. Upon heat treatment, the photosensitive metal particles are precipitated in the irradiated areas and serve as nucleation seeds for subsequent crystal formation. The resultant crystals change the color of the vitroceramic in those irradiated areas.

Photosensitive vitroceramics have been obtained as described in U.S. Pat. No. 2,651,145. This process for producing a photosensitive vitroceramic requires that a sodium-silica base glass containing silver as a photosensitive element be exposed to ultraviolet light. The silver absorbs the incident radiation. Next, a heating process is employed to generate a photographic image by precipitating silver particles in the irradiated areas. These silver particles, in turn, provide nucleation sites for the growth of NaF crystals. The NaF crystals are large enough to scatter visible light, resulting a white opaque image, which is opal-like in appearance.

While fluorescent vitroceramics are known in the art, and while photosensitive vitroceramics also are known in the art, it was not previously known to combine florescent properties with photosensitive properties in the same vitroceramic. Accordingly, it would be desirable to provide a vitroceramic having both fluorescent and photosensitive properties.

It would also be desirable to be able to control the degree of fluorescence of the vitroceramic.

It would further be desirable to be able to control the degree of fluorescence of the vitroceramic in selected areas of the vitroceramic.

It would further be desirable to provide a vitroceramic having both fluorescent and photosensitive properties for use in photography and fluorescent displays.

It would further be desirable to provide a vitroceramic in which the degree of fluorescence can be selectively controlled for use in computer memories.

SUMMARY OF THE INVENTION

The inventive fluorescent photosensitive vitroceramic combines the characteristics of two known vitroceramic types—fluorescent vitroceramics and photosensitive vitroceramics.

In the inventive vitroceramic, the degree of fluorescence can be manipulated via controlled irradiation of the vitroceramic. When the inventive vitroceramic is irradiated in a specific area, the fluorescence intensity in that area is substantially greater than in nonirradiated areas.

It is an object of this invention to provide a vitroceramic having both fluorescent and photosensitive properties.

It is also an object of this invention to be able to control the degree of fluorescence of the vitroceramic.

It is a further object of this invention be desirable to be able to control the degree of fluorescence of the vitroceramic in selected areas of the vitroceramic.

It is a further object of this invention to provide a vitroceramic having both fluorescent and photosensitive properties for use in photography and fluorescent displays.

It is a further object of this invention to provide a vitroceramic in which the degree of fluorescence can be selectively controlled for use in computer memories.

In accordance with this invention, fluorosilicate vitroceramics are prepared which also include one or more rare earths and one or more photosensitizing metals. The rare earths impart fluorescent properties to the vitroceramic while the photosensitizing metals impart photosensitive properties to the vitroceramic. Suitable photosensitizing metals include: silver (Ag), gold (Au) copper (Cu) and combinations thereof. Suitable rare earths for imparting fluorescent properties to the vitroceramic include: terbium (Tb), praseodymium (Pr), dysprosium (Dy), erbium (Er), holmium (Ho), europium (Eu), thulium (Tm) and combinations thereof.

DETAILED DESCRIPTION OF THE INVENTION

In a preferred embodiment of this invention, fluorosilicate vitroceramics are prepared which include one or more photosensitizing metals and one or more rare earths.

In order to make the inventive vitroceramic, it is first necessary to formulate a base glass, preferably a fluorosilicate glass, which also includes one or more photosensitizing metals and one or more rare earths.

Suitable fluorosilicate base glass compositions comprise about 10 mole percent to about 60 mole percent $SiO_2$, about 5 mole percent to about 60 mole percent $PbF_2$, about 0.05 mole percent to about 0.3 mole percent $Sb_2O_3$, up to about 0.05 mole percent $CeO_2$, up to about 60 mole percent $CdF_2$, up to about 30 mole percent $GeO_2$, up to about 10 mole percent $TiO_2$, up to about 10 mole percent $ZrO_2$, up to about 40 mole percent $Al_2O_3$, up to about 40 mole percent $Ga_2O_3$ and about 10 mole percent to about 30 mole percent $Ln1F_3$ where Ln1 is yttrium (Y) or ytterbium (Yb).

The inventive fluorescent photosensitive vitroceramic is made by including in the fluorosilicate base glass one or more photosensitive metals such as silver (Ag), gold (Au) and copper (Cu) and one or more rare earths such as terbium (Tb), praseodymium (Pr), dysprosium (Dy), erbium (Er), holmium (Ho), europium (Eu) and thulium (Tm). These rare earths may be incorporated into the glass in the form of $Ln2F_3$ (where Ln2 is the rare earth) in amounts from about 0.1 mole percent to about 5 mole percent. The photosensitive metal is incorporated in amounts of about 0.01 mole percent to about 0.5 mole percent. Where Ln1 comprises ytterbium (Yb) and Ln2 is selected from the group consisting of Er, Ho, Tm and combinations thereof, the vitroceramic is capable of converting incident infrared radiation invisible light. Alternatively, where Ln1 comprises yttrium (Y) and Ln2 is selected from the group consisting of Tb, Pr, Dy, Ho. Er, Eu, Tm and combinations thereof, the vitroceramic is capable of converting incident ultraviolet light into visible light.

After the fluorosilicate base glass containing one or more rare earths and one or more photosensitizing metals is prepared, the resulting glass is then exposed to ultraviolet light in specific areas. The photosensitizing metals in those areas absorb the radiation. The glass is then subjected to heat treatment at a temperature higher than the glass transition temperature thereby causing the photosensitizing metals in the irradiated areas to precipitate and become available to serve as nucleation seeds for crystallization of fine fluoride crystals. The resulting fine fluoride crystals contain a large amount of rare earth ions.

When the entire vitroceramic is exposed to an excitation radiation in order to cause the rare earth ions to fluoresce (the requisite excitation radiation is dependent on the particular rare earth ions present in the material composition), the presence of fluoride crystals containing rare earth ions can increase the fluorescence intensity of the areas subject to the first irradiation step to levels at least about 100 times the fluorescence intensity of the areas that were not subject to the first irradiation step.

The present invention is illustrated in greater detail by the following three examples. The invention and the merits thereof are not intended to be limited by the materials, compositions and production procedures described in these examples.

In each of the following three examples, the rare earth compounds were of 99% purity grade. The other constituent materials identified were of commercial purity. Fluorescence measurements were conducted using an Amico-Bowman spectrophotofluorometer.

In each of the following three examples, vitroceramic discs 12 mm in diameter and 1 mm thick were obtained.

EXAMPLE 1

A vitroceramic material with the following composition (in mole percent) was prepared: about 30% $SiO_2$, about 14% $Al_2O_3$, about 45% $PbF_2$, about 10% $YbF_3$, about 0.5% $ErF_3$, about 0.05% $CeO_2$, about 0.01% Ag, and about 0.05% $Sb_2O_3$. To make this vitroceramic material, stoichiometric quantities of $SiO_2$, $Al(OH)_3$, $PbF_2$, $YbF_3$, $ErF_3$, $CeO_2$, $Sb_2O_3$ and AgBr in powder form were uniformly mixed and charged to an alumina crucible. Melting was carried out in air at 1100° C for 1 hour. The melted mixture was cast in a graphite mold and annealed at 350° C. for 3 hours.

A specific area of the resulting material was irradiated for 100 hours with ultraviolet light using a 125 watt mercury lamp as a source. The light wavelength was 310 nm and the fluence was 200 $mJ/cm^2$.

Heat treatment of the material at 500° C. for 5 hours resulted in the precipitation of silver (Ag) particles in the irradiated areas. The precipitated silver particles served as nucleation seeds for the formation of fluoride crystals in the glass matrix.

Excitation of the entire sample was carried out at a wavelength of 980 nm (infrared) using a semiconductor laser in order to cause the erbium to fluoresce.

The material had a maximum fluorescence intensity at 550 nm. The fluorescence intensity of the area that initially had been irradiated at 310 nm was at least 100 times more intense than the remainder of the sample.

EXAMPLE 2

A vitroceramic material was prepared in an analogous manner to Example 1. The composition of the resulting material, in mole percent, was: about 30% $SiO_2$, about 45% $PbF_2$, about 14% $Al_2O_3$, about 10% $YF_3$, about 1% $TbF_3$, about 0.05% $Sb_2O_3$ and about 0.01% Ag.

Following the annealing treatment, a specific area of the resulting material was irradiated for 100 hours with ultraviolet light using a 125 watt mercury lamp as a source. The light wavelength was 360 nm and the fluence was 600 $mJ/cm^2$.

Subsequent heat treatment at 500° C. for 5 hours resulted in the precipitation of silver (Ag) particles in the irradiated area. These precipitated silver particles served as nucleation seeds for the formation of fluoride crystals in the glass matrix.

The entire sample was excited using light at a wavelength of 360 nm in order to cause the terbium to fluoresce. A maximum fluorescence emission at 544 nm was observed. The fluorescence intensity of the specific area that had been initially irradiated prior to heat treatment was at least 100 times more intense than the fluorescence intensity of the remainder of the sample.

EXAMPLE 3

A vitroceramic was prepared using a procedure similar to that of Example 2. Powders of $SiO_2$, $PbF_2$, $CdF_2$, $Al(OH)_3$, $YF_3$, $PrF_3$, $Sb_2O_3$ and BrAg were weighed and mixed to yield a material having a composition, in mole percent, of: about 30% $SiO_2$, about 30% $PbF_2$, about 15% $CdF_2$, about 14% $Al_2O_3$, about 10% $YF_3$, about 1% $PrF_3$, about 0.01% Ag, and about 0.05% $Sb_2O_3$.

Following the annealing treatment, a specific area of the resulting material was irradiated for 100 hours with ultraviolet light using a 125 watt mercury lamp as a source. The light wavelength was 360 nm and the fluence was 600 $mJ/cm^2$.

Subsequent heat treatment at 500° C. for 5 hours resulted in the precipitation of silver (Ag) particles in the irradiated area. These precipitated silver particles served as nucleation seeds for the formation of fluoride crystals in the glass matrix.

The entire sample was excited using light at a wavelength of 444 nm in order to cause the praseodymium to fluoresce.

The area of the sample that had been irradiated prior to the crystallization of the fluoride crystals exhibited a fluorescence emission at 510 nm, at least 100 times more intense than the fluorescence emission of the remainder of the sample.

The inventive fluorescent photosensitive vitroceramics find use in a variety of applications including photography, fluorescent displays and in computer memories.

Thus it is seen that fluorescent photosensitive vitroceramics and process for the production thereof are provided. One skilled in the art will appreciate that the present invention can be practiced by other than the described embodiments, which are presented for purposes of illustration and not of limitation, and the present invention is limited only by the claims which follow.

What is claimed is:

1. A fluorescent photosensitive vitroceramic comprising one or more photosensitizing metals and one or more rare earths, said one or more photosensitizing metals imparting photosensitive properties to said vitroceramic and said one or more rare earths imparting fluorescent properties to said vitroceramic.

2. The vitroceramic of claim 1 wherein said one or more photosensitizing metals is selected from the group consisting of silver (Ag), gold (Au), copper (Cu) and combinations thereof; and said one or more rare earths is selected from the group consisting of terbium (Tb), praseodymium (Pr), dysprosium (Dy), erbium (Er), holmium (Ho), europium (Eu), thulium (Tm) and combinations thereof.

3. The vitroceramic of claim 2 wherein said vitroceramic further comprises a fluorosilicate vitroceramic.

4. The vitroceramic of claim 3 wherein said vitroceramic further comprises, in mole percent, about 10% to about 60% $SiO_2$, about 5% to about 60% $PbF_2$, about 0.05% to about 0.3% $Sb_2O_3$, up to about 0.5% $CeO_2$, up to about 60% $CdF_2$, up to about 30% $GeO_2$, up to about 10% $TiO_2$, up to about 10% $ZrO_2$, up to about 40% $Al_2O_3$, up to about 40% $Ga_2O_3$, and about 10% to about 30% $Ln1F_3$ where Ln1 is selected from the group consisting of yttrium (Y) and ytterbium (Yb).

5. The vitroceramic of claim 4 wherein said vitroceramic further comprises about 0.01 mole percent to about 0.5 mole percent of said photosensitizing metal and about 0.1 mole percent to about 5 mole percent of said rare earth in the form of $Ln2F_3$ where Ln2 is said rare earth.

6. A vitroceramic in accordance with claim 5 wherein said Ln1 is ytterbium (Yb) and said Ln2 is selected from the group consisting of Er, Ho, Tm and combinations thereof; whereby said vitroceramic is capable of converting incident infrared radiation into visible light.

7. A vitroceramic in accordance with claim 5 wherein said Ln1 is yttrium (Y) and said Ln2 is selected from the group consisting of Tb, Pr, Dy, Ho, Er, Eu, Tm and combinations thereof; whereby said vitroceramic is capable of converting incident ultraviolet light into visible light.

8. A rare earth based vitroceramic as recited by claim 1, exhibiting both photosensitive properties and fluorescent properties.

9. The rare earth based vitroceramic of claim 8 wherein said photosensitive property comprises a change in the fluorescence intensity of areas of said vitroceramic exposed to photosensitizing radiation.

10. The rare earth based vitroceramic of claim 9 wherein said change in the fluorescence intensity if areas of said vitroceramic exposed to photosensitizing radiation comprises an increase in the fluorescence intensity of areas of said vitroceramic exposed to photosensitizing radiation.

11. A rare earth based vitroceramic as recited by claim 2, exhibiting both photosensitive properties and fluorescent properties.

12. A rare earth based vitroceramic as recited by claim 3, exhibiting both photosensitive properties and fluorescent properties.

13. A rare earth based vitroceramic as recited by claim 4, exhibiting both photosensitive properties and fluorescent properties.

14. A rare earth based vitroceramic as recited by claim 5, exhibiting both photosensitive properties and fluorescent properties.

15. A rare earth based vitroceramic as recited by claim 6, exhibiting both photosensitive properties and fluorescent properties.

16. A rare earth based vitroceramic as recited by claim 7, exhibiting both photosensitive properties and fluorescent properties.

* * * * *